(12) United States Patent
Hofmann et al.

(10) Patent No.: US 8,987,154 B2
(45) Date of Patent: *Mar. 24, 2015

(54) MODULUS, LITHIUM FREE GLASS

(75) Inventors: Douglas Hofmann, Hebron, OH (US);
Peter McGinnis, Gahanna, OH (US);
John Wingert, Granville, OH (US);
Anne Berthereau, Columbus, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/387,469

(22) PCT Filed: Aug. 4, 2010

(86) PCT No.: PCT/US2010/044359
§ 371 (c)(1),
(2), (4) Date: Feb. 21, 2012

(87) PCT Pub. No.: WO2011/017405
PCT Pub. Date: Feb. 10, 2011

(65) Prior Publication Data
US 2012/0135849 A1 May 31, 2012

Related U.S. Application Data

(60) Provisional application No. 61/231,482, filed on Aug. 5, 2009, provisional application No. 61/231,203, filed on Aug. 4, 2009.

(51) Int. Cl.
*C03C 13/00* (2006.01)
*C03C 3/087* (2006.01)
*C03C 3/112* (2006.01)
*C03C 3/091* (2006.01)

(52) U.S. Cl.
CPC .............. *C03C 3/112* (2013.01); *C03C 3/087* (2013.01); *C03C 3/091* (2013.01); *C03C 13/00* (2013.01)
USPC ............ 501/35; 501/36; 501/70; 65/454; 65/455

(58) Field of Classification Search
USPC .......... 501/35, 36, 70; 65/454–456, 458–460, 65/462, 463, 469, 470, 475
See application file for complete search history.

(56) References Cited

U.S. PATENT DOCUMENTS

| | | | |
|---|---|---|---|
| 3,216,808 A | 11/1965 | Bishop et al. | |
| 4,199,364 A | 4/1980 | Neely | |
| 7,799,713 B2 | 9/2010 | Hofmann et al. | 501/36 |
| 7,823,417 B2 * | 11/2010 | Hoffmann et al. | 65/335 |
| 8,341,978 B2 * | 1/2013 | Hofmann et al. | 65/335 |
| 8,476,175 B2 * | 7/2013 | Lecomte | 501/36 |
| 8,563,450 B2 * | 10/2013 | Hofmann et al. | 501/35 |
| 8,703,633 B2 * | 4/2014 | Tang | 501/38 |
| 2007/0087139 A1 * | 4/2007 | Creux et al. | 428/32.71 |
| 2007/0105701 A1 | 5/2007 | Hoffmann | |
| 2008/0009403 A1 * | 1/2008 | Hofmann et al. | 501/55 |
| 2009/0286440 A1 * | 11/2009 | Lecomte et al. | 442/181 |
| 2013/0217822 A1 * | 8/2013 | Hofmann et al. | 524/492 |

FOREIGN PATENT DOCUMENTS

| | | |
|---|---|---|
| CN | 1802327 | 7/2006 |
| CN | 101597140 | 12/2009 |
| CN | 101597140 A * | 12/2009 |
| CN | 101691278 A * | 4/2010 |
| JP | 11-240734 | 9/1999 |
| JP | 11-310431 | 11/1999 |
| RO | 75210 | 9/1981 |
| WO | 2006/064164 | 6/2006 |
| WO | 2009/138661 | 11/2009 |
| WO | 2011/017405 | 2/2011 |

OTHER PUBLICATIONS

Machine Translation of JP 11-310431 A, Nov. 9, 1999.*
Machine Translation of JP 11-240734 A, Sep. 7, 1999.*
International Search Report and Written Opinion from PCT/US10/44359 dated Dec. 29, 2010.
Office action from Chinese Application No. 201080040752.0 dated Nov. 27, 2013, 24 pgs.
Office action from European Application No. 10752654.3 dated Apr. 1, 2014, 5 pgs.
Office action from Russian Application No. 2012107791/03 dated Apr. 21, 2014, received on Jun. 23, 2014.
Tekhnologia Stekla (Glass Technology), I.I. Kitaygorodsky, Moscow, Stroyizdat, 1961, pp. 307-311.
Office action from Mexican Application No. 12/01466 dated Apr. 24, 2014, received on Jun. 12, 2014 along with English translation of relevant portions of action.
Office action from Chinese Application No. 201080040752.0 dated Jul. 9, 2014.
Office action from Russian Application No. 2012107791/03 dated Oct. 6, 2014, received on Oct. 6, 2014.

* cited by examiner

*Primary Examiner* — Anthony J Green
*Assistant Examiner* — Elizabeth A Bolden
(74) *Attorney, Agent, or Firm* — Calfee, Halter & Griswold LLP

(57) ABSTRACT

An R-glass composition including $SiO_2$ in an amount from 59.0 to 64.5% by weight, $Al_2O_3$ in an amount from 14.5 to 20.5% by weight, CaO in an amount from 11.0 to 16.0% by weight, MgO in an amount from 5.5 to 11.5% by weight, $Na2O$ in N an amount from 0.0 to 4.0% by weight, $TiO_2$ in an amount from 0.0 to 2.0% by weight, $Fe_2O_3$ in an amount from 0.0 to 1.0% by weight, $B_2O_3$ in an amount from 0.0 to about 3.0% by weight, $K_2O$, $Fe_2O_3$, $ZrO_2$, and Fluorine, each of which is present in an amount from 0.0 to about 1.0% by weight, and SrO and ZnO, each of which is present in an amount from 0.0 to about 2.0% by weight. In exemplary embodiments, the glass composition does not contain lithium or boron.

18 Claims, No Drawings

US 8,987,154 B2

MODULUS, LITHIUM FREE GLASS

CROSS REFERENCE TO RELATED APPLICATIONS

This application is related to and claims all priority benefits from U.S. Provisional Patent Application Ser. No. 61/231,203 entitled "improved Modulus, Lithium Free Glass" filed Aug. 4, 2009 and U.S. Provisional Patent Application Ser. No. 61/231,482 entitled "Improved Modulus, Lithium Free Glass" filed Aug. 5, 2009, and the entire content of each are expressly incorporated herein by reference in their entireties.

TECHNICAL FIELD AND INDUSTRIAL APPLICABILITY OF THE INVENTION

The present invention relates generally to a glass composition, and more particularly, to a high performance glass composition that achieves acceptable forming and mechanical properties without the addition or inclusion of lithium and whose components are melted in a refractory melter.

BACKGROUND OF THE INVENTION

Glass fibers are manufactured from various raw materials combined in specific proportions to yield a desired chemical composition. This collection of materials is commonly termed a "glass batch." To form glass fibers, typically the glass batch is melted in a melter or melting apparatus, the molten glass is drawn into filaments through a bushing or orifice plate, and an aqueous sizing composition containing lubricants, coupling agents, and film-forming binder resins is applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch and the glass manufactured from it are typically expressed in terms of percentages of the components, which are mainly expressed as oxides. $SiO_2$, $Al_2O_3$, CaO, MgO, $B_2O_3$, $Na_2O$, $K_2O$, $Fe_2O_3$, and minor amounts of other compounds such as $TiO_2$, $Li_2O$, BaO, SrO, ZnO, $ZrO_2$, $P_2O_5$, fluorine, and $SO_3$ are common components of a glass batch. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

Conventionally, lithium is added to glass fiber compositions in the form of spodumene (a lithium aluminosilicate raw material) to facilitate melting and obtain desirable mechanical and forming properties. For example, lithium is very effective in reducing the viscosity of the glass formulation. Although lithium-containing glass compositions may possess desirable properties with respect to mechanical and forming properties, the presence of lithium in the glass composition raises the cost of glass fiber manufacturing. This cost could be offset if the inclusion of lithium lowered the viscosity sufficiently to enable a high-performance glass such as R-glass to be melted in a refractory tank rather than in a platinum melter. R-glass is commonly melted in platinum melters.

There is a unique combination of forming properties that permit a glass to be melted and distributed in a conventional refractory tank and glass distribution system. First, the temperature at which the glass is held must be low enough so that it does not aggressively attack the refractory. An attack on a refractory can take place, for example, by exceeding the maximum use temperature of the refractory or by increasing the rate at which the glass corrodes and erodes the refractory to an unacceptably high level. Refractory corrosion rate is strongly increased as the glass becomes more fluid by a decrease in the glass viscosity. Therefore, in order for a glass to be melted in a refractory tank, the temperature of the refractory tank must be kept below a certain temperature and the viscosity (for example, resistance to flow) must be maintained above a certain viscosity. Also, the temperature of the glass in the melting unit, as well as throughout the entire distribution and fiberizing process, must be high enough to prevent crystallization of the glass (that is, it must be kept at a temperature above the liquidus temperature).

At the fiberizer, it is common to require a minimum temperature differential between the temperature selected for fiberizing (that is, forming temperature) and the liquidus temperature of the glass. This temperature differential, $\Delta T$, is a measurement of how easily continuous fibers can be formed without production of the fibers being interrupted by breaks caused from devitrification. Accordingly, it is desirable to have as large a $\Delta T$ as possible to achieve continuous and uninterrupted glass fiber formation.

In the quest for glass fibers having a higher end performance, $\Delta T$ has, at times, been sacrificed to achieve desired end properties. The consequence of this sacrifice is a requirement that the glass be melted in a platinum or platinum-alloy lined furnace, either because the temperature exceeded the maximum end use temperature of the conventional refractory materials or because the viscosity of the glass was such that the temperature of the glass body could not be held above the liquidus temperature while producing a glass viscosity high enough to keep the refractory corrosion at an acceptable level. S-glass is a good example where both of these phenomena take place. The melting temperature of S-glass is too high for common refractory materials and the $\Delta T$ is very small (or negative), thus causing the glass to be very fluid and very corrosive to conventional refractories. Conventional R-glass also has a very small $\Delta T$, and is therefore melted in platinum or platinum-alloy lined melters. The addition of lithium to the formulation sufficiently expands the $\Delta T$ of the R-glass to permit it to be melted in a standard refractory inciter. However, lithium raw materials are very expensive and greatly increase the manufacturing costs for the glass fibers.

Thus, there is a need in the art for high-performance, lithium-free glass compositions that retain favorable mechanical and physical properties (for example, specific modulus and tensile strength) and forming properties (for example, liquidus temperature and forming temperature) where the forming temperature is sufficiently low and the difference between the forming and liquidus temperatures is large enough to enable the components of the glass composition to be melted in a conventional refractory tank.

SUMMARY OF THE INVENTION

In one embodiment of the invention, an R-glass composition that includes $SiO_2$ in an amount from 59.0 to 64.5% by weight, $Al_2O_3$ in an amount from 14.5 to 20.5% by weight, CaO in an amount from 11.0 to 16.0% by weight, MgO in an amount from 5.5 to 11.5% by weight, $Na_2O$ in an amount from 0.0 to 4.0% by weight, $TiO_2$ in an amount from 0.0 to 2.0% by weight, $B_2O_3$ in an amount from 0.0 to about 3.0% by weight, $K_2O$, $Fe_2O_3$, $ZrO_2$, and Fluorine, each of which is present in an amount from 0.0 to about 1.0% by weight, and SrO and ZnO, each of which is present in an amount from 0.0 to about 2.0% by weight is provided. The phrase "% by weight", as used herein, is intended to be defined as the percent by weight of the total composition. Additionally, the composition may optionally contain trace quantities of other components or impurities. In exemplary embodiments, the glass composition is free or substantially free of lithium and boron. Further, the glass composition possesses a forming viscosity that is low enough to utilize low cost refractory melters instead of conventional high cost platinum-alloy lined melters in the formation of the glass fibers.

In another embodiment of the present invention, a continuous R-glass fiber formed of the composition described above is produced using a refractory tank melter. By utilizing a refractory tank formed of refractory blocks, manufacturing costs associated with the production of glass fibers produced by the inventive composition may be reduced. The R-glass compositions may be used to form continuous glass strands for use in textiles and as reinforcements for use in forming wind blades and aerospace structures.

In yet another embodiment of the present invention, a method of forming an R-glass fiber is provided. The fibers may be formed by obtaining the raw ingredients and mixing the components in the appropriate quantities to give the desired weight percentages of the final composition. The mixed batch is then melted in a traditional refractory melter and drawn through orifices of platinum-alloy based bushings to form glass fibers. Strands of glass fibers are formed by gathering the individual filaments together. The strands may be wound and further processed in a conventional manner suitable for the intended application.

In another embodiment of the present invention, glass fibers formed from the inventive compositions have a liquidus temperature no greater than about 1330° C., a log 3 temperature less than about 1405° C., a $\Delta T$ up to about 135° C., and a specific modulus of at least $3.24 \times 10^6$ meters.

In yet another embodiment of the present invention, glass fibers formed from the inventive compositions have a strength from about 4187 Mpa to about 4357 Mpa.

In a further embodiment of the present invention, the glass composition possesses a forming viscosity that is low enough, and a $\Delta T$ large enough, to utilize low cost refractory melters instead of conventional high cost platinum-alloy lined melters in the formation of the glass fibers.

In another embodiment of the present invention, fibers formed from the inventive R-glass composition are formed at a lower cost due to the lower energy input needed to melt the glass composition.

In yet another embodiment of the present invention, the inventive glass has a specific modulus strength and $\Delta T$ similar to traditional R-glass compositions that contain lithium. Thus, the composition of the present invention retains the ability to make a commercially acceptable R-glass fiber and fiber product produced from the R-glass fibers.

In a further embodiment of the present invention, the glass composition reduces production cost by excluding lithium from the composition and utilizing a conventional refractory melting operation to melt the components of the composition.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "composition" and "formulation" may be used interchangeably herein. Additionally, the phrase "inventive glass composition" and "glass composition" may be interchangeably used.

The present invention relates to a high performance R-glass composition that does not contain lithium and which possesses a specific modulus, tensile strength, and density that are equivalent or substantially equivalent to R-glass compositions. The glass composition possesses a lower forming temperature and larger $\Delta T$ than conventional R-glasses, thereby permitting the utilization of low-cost refractory tank melters for the formation of the glass fibers instead of conventional high-cost paramelters formed of platinum. By utilizing a refractory tank formed of refractory blocks, manufacturing costs associated with the production of glass fibers produced by the inventive composition are reduced. Additionally, the exclusion of expensive lithium raw materials from the composition reduces the manufacturing costs of the glass fibers. Further, the energy necessary to melt the components of the glass composition is less than the energy necessary to melt commercially available R-glass formulations. Such lower energy requirements may also lower the overall manufacturing costs associated with the inventive glass. It has been discovered that the composition of the present invention retains the ability to make a commercially acceptable high performance glass fiber and fiber product produced from the glass fibers.

In at least one exemplary embodiment, the inventive glass composition includes the following components in the weight percent ranges given in Table 1. As used herein, the terms "weight percent" and "percent by weight" may be used interchangeably and are meant to denote the weight percent (or percent by weight) based on the total composition. In exemplary embodiments, the inventive glass composition is free or substantially free of lithium, and in some exemplary embodiments, the glass composition is substantially free of lithium and boron. As used herein, the phrase "substantially free" is meant to denote that the composition is free or nearly free of that component(s). For instance, it is to be appreciated that if lithium is present in the glass composition, it is present in only in trace amounts, such as, for example, several hundredths of a percent. Similarly, glass compositions intended to exclude boron may contain trace amounts of boron such as in the range of several hundredths of a percent. Compositions containing such amounts are considered to be "free of lithium" and "free of boron".

TABLE 1

| Chemical | % by weight |
|---|---|
| $SiO_2$ | 59.0-64.5 |
| $TiO_2$ | 0.0-2.0 |
| $Al_2O_3$ | 14.5-20.5 |
| CaO | 11.0-16.0 |
| MgO | 5.5-11.5 |
| $Na_2O$ | 0.0-4.0 |
| $K_2O$ | 0-1.0 |

TABLE 1-continued

| Chemical | % by weight |
|---|---|
| $Fe_2O_3$ | 0-1.0 |
| SrO | 0-2.0 |
| ZnO | 0-2.0 |
| $ZrO_2$ | 0-1.0 |
| Fluorine | 0-1.0 |
| $B_2O_3$ | 0.0-3.0 |

In another embodiment of the invention, the glass composition includes the components set forth in Table 2.

TABLE 2

| Chemical | % by weight |
|---|---|
| $SiO_2$ | 60.0-64.5 |
| $Al_2O_3$ | 14.6-20.4 |
| $TiO_2$ | 0.0-2.0 |
| CaO | 11.0-15.8 |
| MgO | 5.7-11.2 |
| $Na_2O + K_2O$ | <2 |
| $B_2O_3$ | 0-1.0 |
| $Fe_2O_3$ | 0-1.0 |
| SrO | 0-1.0 |
| ZnO | 0-1.0 |
| Fluorine | 0-1.0 |

In yet further embodiments, the glass compositions include the components set forth in Tables 3 and 4.

TABLE 3

| Chemical | % by weight |
|---|---|
| $SiO_2$ | 60.0-61.6 |
| $TiO_2$ | 0-2.0 |
| $Al_2O_3$ | 15.6-17.2 |
| CaO | 11.7-13.2 |
| MgO | 9.4-10.9 |
| $Na_2O + K_2O$ | <2 |
| $B_2O_3$ | 0.0-0.5 |
| $Fe_2O_3$ | 0-1.0 |
| SrO | 0-1.0 |
| ZnO | 0-1.0 |
| Fluorine | 0-1.0 |

TABLE 4

| Chemical | % by weight |
|---|---|
| $SiO_2$ | 60.0-61.6 |
| $TiO_2$ | 0-2.0 |
| $Al_2O_3$ | 15.6-17.2 |
| CaO | 11.7-13.2 |
| MgO | 9.4-10.9 |
| $Na_2O + K_2O$ | <2 |
| $B_2O_3$ | 0.0-0.2 |
| $Fe_2O_3$ | 0-1.0 |
| SrO | 0-1.0 |
| ZnO | 0-1.0 |
| Fluorine | 0-1.0 |

Further, impurities or tramp materials may be present in the glass composition without adversely affecting the glasses or the fibers. These impurities may enter the glass as raw material impurities or may be products formed by the chemical reaction of the molten glass with furnace components. Non-limiting examples of tramp materials include potassium, iron, zinc, strontium, and barium, all of which are present in their oxide forms, and fluorine and chlorine.

The forming viscosity of a glass composition is commonly defined by its log 3 temperature. The log 3 temperature is the temperature at which the molten glass composition has a viscosity of 1,000 poise (that is, roughly the fiberizing viscosity), where the viscosity is determined by measuring the torque needed to rotate a cylinder immersed in the molten glass material according to ASTM C965. Lowering the fiberizing temperature may reduce the production cost of the glass fibers because it allows for a longer bushing life, increased throughput, and reduced energy usage. By lowering the log 3 temperature, a bushing operates at a cooler temperature and does not quickly "sag". Sag occurs in bushings held at an elevated temperature for extended periods of time. Lowering the log 3 temperature reduces the sag rate, and, as a result, the bushing life may be increased. Thus, the cost of producing the fibers may be reduced. In the present invention, the glass composition has a log 3 temperature less than about 1405° C. In exemplary embodiments, the log 3 temperature is from about 1285° C. to about 1405° C., or from about 1285° C. to about 1320° C.

The liquidus temperature of the glass composition is the temperature below which the first crystal appears in the molten glass material when it is held at that temperature for 16 hours, according to ASTM C829. Additionally, the liquidus temperature is the greatest temperature at which devitrification can occur upon cooling the glass melt. At all temperatures above the liquidus temperature, the glass is completely molten. The liquidus temperature of the inventive composition is desirably no greater than about 1330° C., and may range from about 1190° C. to about 1330° C. or from 1190° C. to about 1235° C.

The difference between the log 3 temperature and the liquidus temperature is termed "ΔT". If the ΔT is too small, the molten glass may crystallize within the fiberizing apparatus and cause a break in the manufacturing process. Desirably, the ΔT is as large as possible for a given forming viscosity. A larger ΔT offers a greater degree of flexibility during fiberizing and helps to avoid devitrification both in the glass distribution system and in the fiberizing apparatus. Additionally, a large ΔT reduces the production cost of the glass fibers by allowing for a greater bushing life and a less sensitive forming process. The inventive composition may have a ΔT up to about 135° C., and in exemplary embodiments, from about 60° C. to about 135° C. or from about 75° C. to 105° C. In some exemplary embodiments, the ΔT is greater than about 60° C.

Another property of importance is the specific modulus. Is it desirable to have a specific modulus as high as possible to achieve a lightweight composite material that adds stiffness to the final article. Specific modulus is important in applications where stiffness of the product is an important parameter, such as in wind energy and aerospace applications. In the inventive composition, the glass has a specific modulus of at least $3.24 \times 10^6$ meters, or from about $3.24 \times 10^6$ meters to about $3.43 \times 10^6$ meters. In exemplary embodiments, the glass has a specific modulus from about $339 \times 10^6$ meters to about $3.43 \times 10^6$ meters.

The inventive glass has a specific modulus, strength, and ΔT similar to traditional R-glass compositions that contain lithium. Thus, the composition of the present invention retains the ability to make a commercially acceptable R-glass fiber and fiber product produced from the R-glass fibers and is able to reduce the cost of production by excluding high cost lithium from the composition and utilizing a conventional refractory to melt the components of the composition.

In general, fibers according to the present invention may be formed by obtaining the raw ingredients and mixing or blending the components in a conventional manner in the appropriate quantities to give the desired weight percentages of the final composition. For example, the components may be obtained from suitable ingredients or raw materials including, but not limited to, sand or pyrophyllite for $SiO_2$, limestone, burnt lime, wollastonite, or dolomite for CaO, kaolin, alumina or pyrophyllite for $Al_2O_3$, and dolomite, dolomitic quicklime, brucite, enstatite, talc, burnt magnesite, or magnesite for MgO. Glass cullet can also be used to supply one or more of the needed oxides. The mixed batch is then melted in a traditional refractory furnace or melter, and the resulting molten glass is passed along a forehearth and into bushings (for example, platinum-alloy based bushings) located along the bottom of the forehearth. The operating temperatures of the glass in the furnace, forehearth, and bushing are selected to appropriately adjust the viscosity of the glass, and may be maintained using suitable methods such as control devices. Preferably, the temperature at the front end of the inciter is automatically controlled to reduce or eliminate devitrification. The molten glass is then pulled (drawn) through holes or orifices in the bottom or tip plate of the bushing to form glass fibers. The streams of molten glass flowing through the bushing orifices are attenuated to filaments by winding a strand formed of a plurality of individual filaments on a forming tube mounted on a rotatable collet of a winding machine.

The fibers may be further processed in a conventional manner suitable for the intended application. For instance, the glass fibers may be sized with a sizing composition known to those of skill in the art. The sizing composition is in no way restricted, and may be any sizing composition suitable for application to glass fibers. The sized fibers may be used for reinforcing substrates such as a variety of plastics where the product's end use requires strength and stiffness equal to or superior to traditional R-glass products. Such applications include, but are not limited to, woven fabrics for use in forming wind blades, armor plating, and aerospace structures.

Having generally described this invention, a further understanding can be obtained by reference to certain specific examples illustrated below which are provided for purposes of illustration only and are not intended to be all inclusive or limiting unless otherwise specified.

EXAMPLES

Example 1

Lithium Free Glass Compositions

Glass compositions according to the present invention were made by mixing reagent grade chemicals in proportioned amounts to achieve a final glass composition with the oxide weight percentages set forth in Tables 5-8. The raw materials were melted in a platinum crucible in an electrically heated furnace at a temperature of 1620° C. for 3 hours. The forming viscosity (that is, log 3 temperature) was measured using a rotating cylinder method (ASTM C965). The liquidus temperature was measured by exposing glass to a temperature gradient in a platinum-alloy boat for 16 hours (ASTM C829). ΔT was calculated as the difference between the temperature at which the viscosity of the glass was 1000 poise and the liquidus temperature. The speed of sound was measured using the sonic fiber method whereby a sound wave is propagated down the length of a fiber. The modulus was calculated based on the relationship between the speed of sound, density, and Young's modulus. Density was measured by the Archimedes method. Finally, the specific modulus was calculated from the Young's modulus and measured density.

Example 1 set forth in Table 5 is a conventional lithium-containing R-glass. The composition and properties for this lithium-containing R-glass were included for comparison purposes.

TABLE 5

|  | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) | Ex. 8 (% by wt.) |
|---|---|---|---|---|---|---|---|---|
| Chemical | | | | | | | | |
| $SiO_2$ | 60.15 | 60.57 | 60.18 | 60.18 | 60.18 | 60.18 | 60.18 | 60.18 |
| $TiO_2$ | 0.30 | 0.4 | 1.00 | 0.00 | 0.50 | 0.50 | 0.50 | 0.00 |
| $Al_2O_3$ | 16.27 | 16.34 | 17.15 | 17.15 | 17.15 | 17.15 | 17.15 | 17.15 |
| CaO | 13.61 | 12.65 | 12.24 | 12.24 | 12.24 | 12.24 | 12.24 | 12.24 |
| MgO | 8.10 | 9.95 | 9.43 | 9.43 | 9.43 | 9.43 | 9.43 | 9.43 |
| $Na_2O$ | 0.31 | 0.03 | 0.00 | 0.00 | 0.50 | 0.00 | 0.00 | 0.00 |
| $Li_2O$ | 0.75 | 0.00 | 0.00 | 0.00 | 0.00 | 0.00 | 0.00 | 0.00 |
| $K_2O$ | 0.20 | 0.00 | 0.00 | 1.00 | 0.00 | 0.50 | 0.00 | 0.50 |
| $Fe_2O_3$ | 0.29 | 0.06 | 0.00 | 0.00 | 0.00 | 0.00 | 0.50 | 0.50 |
| $B_2O_3$ | 0.00 | 0.00 | 0.00 | 0.00 | 0.00 | 0.00 | 0.00 | 0.00 |
| Property | | | | | | | | |
| Log 3 Temp (° C.) | 1269 | 1299 | 1304 | 1318 | 1304 | 1312 | 1308 | 1317 |
| Liquidus Temp (° C.) | 1187 | 1196 | 1229 | 1235 | 1223 | 1233 | 1221 | 1234 |
| ΔT (° C.) | 82 | 103 | 75 | 84 | 81 | 79 | 88 | 83 |
| Modulus (GPa) | 87.5 | 87.7 | 87.5 | 86.3 | 87.4 | 87.0 | 87.5 | 86.9 |
| Density (g/cm³) | 2.610 | 2.621 | 2.619 | 2.603 | 2.615 | 2.612 | 2.620 | 2.611 |
| Specific Modulus (Meters × $10^6$) | 3.42 | 3.41 | 3.41 | 3.38 | 3.41 | 3.39 | 3.41 | 3.39 |
| Strength (Mpa) | | | | | | | | |

TABLE 6

|  | Ex. 9 (% by wt.) | Ex. 10 (% by wt.) | Ex. 11 (% by wt) | Ex. 12 (% by wt.) | Ex. 13 (% by wt.) | Ex. 14 (% by wt.) | Ex. 15 (% by wt.) | Ex. 16 (% by wt.) |
|---|---|---|---|---|---|---|---|---|
| Chemical | | | | | | | | |
| $SiO_2$ | 60.93 | 60.93 | 60.93 | 60.93 | 60.93 | 60.93 | 60.93 | 60.93 |
| $TiO_2$ | 0.25 | 1.00 | 0.00 | 0.00 | 0.50 | 0.50 | 0.50 | 0.00 |
| $Al_2O_3$ | 15.65 | 15.65 | 15.65 | 15.65 | 15.65 | 15.65 | 15.65 | 15.65 |
| CaO | 12.24 | 12.24 | 12.24 | 12.24 | 12.24 | 12.24 | 12.24 | 12.24 |
| MgO | 10.18 | 10.18 | 10.18 | 10.18 | 10.18 | 10.18 | 10.18 | 10.18 |
| $Na_2O$ | 0.25 | 0.00 | 1.00 | 0.00 | 0.50 | 0.00 | 0.00 | 0.00 |
| $Li_2O$ | 0.00 | 0.00 | 0.00 | 0.00 | 0.00 | 0.00 | 0.00 | 0.00 |
| $K_2O$ | 0.25 | 0.00 | 0.00 | 1.00 | 0.00 | 0.50 | 0.00 | 0.50 |
| $Fe_2O_3$ | 0.25 | 0.00 | 0.00 | 0.00 | 0.00 | 0.00 | 0.50 | 0.50 |
| $B_2O_3$ | 0.00 | 0.00 | 0.00 | 0.00 | 0.00 | 0.00 | 0.00 | 0.00 |
| Property | | | | | | | | |
| Log 3 Temp (° C.) | 1301 | 1298 | 1294 | 1308 | 1299 | 1306 | 1299 | 1306 |
| Liquidus Temp (° C.) | 1224 | 1209 | 1223 | 1232 | 1216 | 1229 | 1220 | 1216 |
| ΔT (° C.) | 77 | 89 | 72 | 76 | 83 | 77 | 79 | 90 |
| Modulus (GPa) | 87.0 | 87.1 | 86.7 | 85.8 | 87.1 | 86.6 | 87.4 | 86.7 |
| Density (g/cm³) | 2.615 | 2.619 | 2.61 | 2.603 | 2.615 | 2.612 | 2.612 | 2.622 |
| Specific Modulus (Meters × $10^6$) | 3.39 | 3.39 | 3.39 | 3.36 | 3.40 | 3.38 | 3.40 | 3.38 |
| Strength (Mpa) | | | | | | | | |

TABLE 7

|  | Ex. 17 (% by wt.) | Ex. 18 (%by wt.) | Ex. 19 (% by wt) | Ex. 20 (% by wt.) | Ex. 21 (% by wt.) | Ex. 22 (% by wt.) | Ex. 23 (%by wt.) | Ex. 24 (% by wt.) |
|---|---|---|---|---|---|---|---|---|
| Chemical | | | | | | | | |
| $SiO_2$ | 60.01 | 60.01 | 60.01 | 60.01 | 60.01 | 60.61 | 60.53 | 60.57 |
| $TiO_2$ | 0.25 | 1.00 | 0.00 | 0.00 | 0.00 | 0.42 | 0.33 | 0.40 |
| $Al_2O_3$ | 16.02 | 16.02 | 16.02 | 16.02 | 16.02 | 16.32 | 16.26 | 16.34 |
| CaO | 12.96 | 12.96 | 12.96 | 12.96 | 12.96 | 11.36 | 11.09 | 12.65 |
| MgO | 10.01 | 10.01 | 10.01 | 10.01 | 10.01 | 11.18 | 11.18 | 9.95 |
| $Na_2O$ | 0.25 | 0.00 | 1.00 | 0.00 | 0.00 | 0.03 | 0.05 | 0.03 |
| $Li_2O$ | 0.00 | 0.00 | 0.00 | 0.00 | 0.00 | 0.00 | 0.00 | 0.00 |
| $K_2O$ | 0.25 | 0.00 | 0.00 | 1.00 | 0.00 | 0.00 | 0.23 | 0.00 |
| $Fe_2O_3$ | 0.25 | 0.00 | 0.00 | 0.00 | 1.00 | 0.06 | 0.32 | 0.06 |
| $B_2O_3$ | 0.00 | 0.00 | 0.00 | 0.00 | 0.00 | 0.00 | 0.00 | 0.00 |
| Property | | | | | | | | |
| Log 3 Temp (° C.) | 1290 | 1289 | 1287 | 1298 | 1291 | 1300 | 1301 | 1308 |
| Liquidus Temp (° C.) | 1216 | 1213 | 1199 | 1219 | 1212 | 1233 | 1235 | 1220 |
| ΔT (° C.) | 88 | 88 | 88 | 86 | 87 | 88 | 87 | 87 |
| Modulus (GPa) | 87.1 | 87.6 | 87.1 | 85.6 | 87.5 | 88.2 | 88.1 | 87.3 |
| Density (g/cm³) | 2.628 | 2.632 | 2.624 | 2.619 | 2.638 | 2.619 | 2.618 | 2.606 |
| Specific Modulus (Meters × $10^6$) | 3.38 | 3.39 | 3.38 | 3.33 | 3.38 | 3.43 | 3.43 | 3.42 |
| Strength (Mpa) | | | | | | 4187 | 4331 | 4237 |

TABLE 8

|  | Ex. 25 (% by wt.) | Ex. 26 (% by wt.) | Ex. 27 (% by wt) | Ex. 28 (% by wt.) | Ex. 29 (% by wt.) | Ex. 30 (% by wt.) | Ex. 31 (% by wt.) | Ex. 32 (% by wt.) | Ex. 33 (% by wt.) |
|---|---|---|---|---|---|---|---|---|---|
| Chemical | | | | | | | | | |
| $SiO_2$ | 60.57 | 60.57 | 60.57 | 60.57 | 60.57 | 59.57 | 60.57 | 60.57 | 59.57 |
| $TiO_2$ | 0.4 | 0.4 | 0.4 | 0.4 | 0.4 | 0.4 | 0.4 | 0.4 | 0.4 |
| $Al_2O_3$ | 16.34 | 16.34 | 16.34 | 16.34 | 16.34 | 16.34 | 16.34 | 16.34 | 16.34 |
| CaO | 12.2 | 11.75 | 12.65 | 12.2 | 11.75 | 12.65 | 11.65 | 11.65 | 12.65 |
| MgO | 10.4 | 10.85 | 9.95 | 10.4 | 10.85 | 9.95 | 9.95 | 9.95 | 9.95 |
| $Na_2O$ | 0.03 | 0.03 | 0.03 | 0.03 | 0.03 | 0.03 | 0.03 | 0.03 | 0.03 |
| $Li_2O$ | 0.00 | 0.00 | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 | 0.00 | 0.00 |
| $Fe_2O_3$ | 0.06 | 0.06 | 0.06 | 0.06 | 0.06 | 0.06 | 0.06 | 0.06 | 0.06 |

TABLE 8-continued

|  | Ex. 25 (% by wt.) | Ex. 26 (% by wt.) | Ex. 27 (% by wt) | Ex. 28 (% by wt.) | Ex. 29 (% by wt.) | Ex. 30 (% by wt.) | Ex. 31 (% by wt.) | Ex. 32 (% by wt.) | Ex. 33 (% by wt.) |
|---|---|---|---|---|---|---|---|---|---|
| $B_2O_3$ | 0.00 | 0.00 | 0.00 | 0.00 | 0.00 | 1.00 | 0.00 | 0.00 | 0.00 |
| SrO | 0.00 | 0.00 | 0.00 | 0.00 | 0.00 | 0.00 | 1.00 | 0.00 | 0.00 |
| ZnO | 0.00 | 0.00 | 0.00 | 0.00 | 0.00 | 0.00 | 0.00 | 1.00 | 0.00 |
| Fluorine | 0.00 | 0.00 | 0.00 | 0.00 | 0.00 | 0.00 | 0.00 | 0.00 | 1.00 |
| Log 3 Temp (° C.) | 1303 | 1301 | 1299 | 1300 | 1298 | 1288 | 1307 | 1307 | 1284 |
| Property |  |  |  |  |  |  |  |  |  |
| Liquidus Temp (° C.) | 1226 | 1229 | 1196 | 1220 | 1232 | 1211 | 1218 | 1220 | 1210 |
| ΔT (° C.) | 77 | 72 | 104 | 80 | 66 | 77 | 89 | 86 | 75 |
| Modulus (GPa) | 88.1 | 88.0 | 87.7 | 88.1 | 88.0 | 86.4 | 86.8 | 87.4 | 87.1 |
| Density (g/cm$^3$) | 2.620 | 2.618 | 2.621 | 2.62 | 2.618 | 2.617 | 2.624 | 2.627 | 2.623 |
| Specific Modulus (Meters × 10$^6$) | 3.43 | 3.43 | 3.41 | 3.43 | 3.43 | 3.36 | 3.37 | 3.39 | 3.38 |
| Strength (Mpa) |  | 4220 |  |  |  | 4316 | 4282 | 4357 | 4233 |

Looking at Tables 5-8, it can be concluded that the glass compositions of Examples 2-33 have forming viscosities and liquidus temperatures that permit them to be produced in a refractory melter without including lithium in the composition. In addition, the exclusion of lithium from the glass composition greatly reduces the production cost of the glass since spodumene and lithium carbonate, which are very expensive, are not required as materials for the batch formulations. Also, many of the compositions listed in Tables 5-8 met or exceeded the specific modulus of commercially available R-glass that included lithium in the composition (for example, Example 1). The inventive glass has strength that is equal to or improved over conventional lithium-containing R-glass compositions.

Example 2

Glass Formulations Containing Lithium

Glasses which included lithium were also investigated for comparison to the inventive glass compositions. Tables 9 and 10 set forth the data obtained regarding the log 3 temperature, the liquidus temperature, the ΔT, the modulus, the density, and the specific modulus for each of the lithium-containing glass compositions.

TABLE 9

|  | Ex. 34 (% by wt.) | Ex. 35 (% by wt.) | Ex. 36 (% by wt) | Ex. 37 (% by wt.) | Ex. 38 (% by wt.) | Ex. 39 (% by wt.) | Ex. 40 (% by wt.) | Ex. 41 (% by wt.) | Ex. 42 (% by wt.) | Ex. 43 (% by wt.) |
|---|---|---|---|---|---|---|---|---|---|---|
| Chemical |  |  |  |  |  |  |  |  |  |  |
| $SiO_2$ | 60.51 | 58.50 | 58.57 | 61.32 | 58.67 | 58.61 | 58.75 | 58.77 | 58.65 | 59.29 |
| $TiO_2$ | 0.16 | 1.69 | 0.03 | 0.03 | 1.57 | 1.57 | 1.57 | 0.48 | 0.49 | 0.95 |
| $Al_2O_3$ | 16.28 | 14.75 | 17.55 | 18.18 | 17.09 | 15.96 | 17.42 | 17.35 | 17.40 | 16.45 |
| CaO | 14.10 | 12.18 | 12.16 | 12.66 | 13.43 | 13.48 | 13.50 | 14.24 | 13.43 | 14.08 |
| MgO | 7.73 | 9.93 | 8.55 | 5.82 | 6.34 | 7.70 | 7.51 | 6.36 | 7.73 | 6.90 |
| $Na_2O$ | 0.77 | 0.11 | 0.13 | 0.32 | 2.44 | 0.82 | 0.80 | 0.76 | 0.85 | 1.27 |
| $Li_2O$ | 0.45 | 2.85 | 3.01 | 1.67 | 0.46 | 1.85 | 0.44 | 2.04 | 1.44 | 1.06 |
| Property |  |  |  |  |  |  |  |  |  |  |
| Log 3 Temp (° C.) | 1283 | 1143 | 1185 | 1286 | 1275 | 1203 | 1269 | 1217 | 1236 | 1251 |
| Liquidus Temp (° C.) | 1233 | 1190 | 1165 | 1225 | 1223 | 1184 | 1245 | 1197 | 1253 | 1198 |
| ΔT (° C.) | 50 | −47 | 20 | 61 | 52 | 19 | 24 | 20 | −17 | 53 |
| Modulus (GPa) | 87 | 91 | 91 | 88 | 86 |  |  |  |  |  |
| Density (g/cm$^3$) | 2.610 | 2.640 | 2.613 | 2.578 | 2.611 | 2.630 | 2.626 | 2.617 | 2.620 | 2.619 |
| Specific Modulus (Meters × 10$^6$) | 3.40 | 3.53 | 3.53 | 3.47 | 3.36 |  |  |  |  |  |

TABLE 10

|  | Ex. 44 (% by wt.) | Ex. 45 (% by wt.) | Ex. 46 (% by wt) | Ex. 47 (% by wt.) | Ex. 48 (% by wt.) | Ex. 49 (% by wt.) | Ex. 50 (% by wt.) | Ex. 51 (% by wt.) | Ex. 52 (% by wt.) | Ex. 53 (% by wt.) |
|---|---|---|---|---|---|---|---|---|---|---|
| Chemical |  |  |  |  |  |  |  |  |  |  |
| $SiO_2$ | 59.61 | 61.40 | 60.19 | 58.25 | 57.42 | 62.29 | 60.55 | 61.52 | 60.32 | 61.33 |
| $TiO_2$ | 0.28 | 0.02 | 1.36 | 1.06 | 0.62 | 0.51 | 0.62 | 0.66 | 0.62 | 0.63 |
| $Al_2O_3$ | 16.90 | 16.86 | 15.96 | 15.34 | 15.25 | 14.58 | 15.61 | 15.98 | 16.29 | 16.36 |
| CaO | 14.45 | 12.71 | 13.55 | 16.08 | 15.92 | 12.76 | 13.32 | 12.57 | 13.46 | 12.45 |
| MgO | 7.16 | 5.82 | 7.70 | 6.85 | 7.42 | 8.71 | 9.12 | 8.57 | 8.34 | 8.25 |

TABLE 10-continued

|  | Ex. 44 (% by wt.) | Ex. 45 (% by wt.) | Ex. 46 (% by wt) | Ex. 47 (% by wt.) | Ex. 48 (% by wt.) | Ex. 49 (% by wt.) | Ex. 50 (% by wt.) | Ex. 51 (% by wt.) | Ex. 52 (% by wt.) | Ex. 53 (% by wt.) |
|---|---|---|---|---|---|---|---|---|---|---|
| $Na_2O$ | 0.85 | 0.31 | 0.82 | 1.46 | 0.94 | 0.16 | 0.18 | 0.16 | 0.28 | 0.38 |
| $Li_2O$ | 0.75 | 2.89 | 0.40 | 0.95 | 2.43 | 1.01 | 0.60 | 0.54 | 0.69 | 0.59 |
| Property |  |  |  |  |  |  |  |  |  |  |
| Log 3 Temp (° C.) | 1262 | 1203 | 1281 | 1203 | 1182 | 1254 | 1240 | 1277 | 1259 | 1279 |
| Liquidus Temp (° C.) | 1219 | 1146 | 1196 | 1211 | 1192 | 1191 | 1198 | 1186 | 1208 | 1208 |
| ΔT (° C.) | 43 | 56 | 86 | −8 | −10 | 63 | 42 | 90 | 51 | 71 |
| Modulus (GPa) |  | 88 |  | 88 |  | 88 | 89 | 88 | 89 | 87 |
| Density (g/cm³) | 2.619 | 2.579 | 2.618 | 2.649 | 2.647 | 2.601 | 2.619 | 2.601 | 2.615 | 2.585 |
| Specific Modulus (Meters × 10⁶) |  | 3.48 |  | 3.41 |  | 3.44 | 3.45 | 3.45 | 3.46 | 3.43 |

It can be concluded from Tables 9 and 10 that levels of $Li_2O$ greater than 1 percent generally resulted in ΔT levels that were less than desirable for melting in a conventional refractory melter. It was noted that a few glasses having a $Li_2O$ content near 0.5% did possess acceptable forming and product properties; however, production costs for those glasses would be far greater than production costs for the inventive lithium-free glass compositions due to the need for expensive lithium raw materials.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

We claim:

1. A composition for preparing R-glass fibers comprising:
   $SiO_2$ in an amount from 60.0 to 64.5% by weight of the total composition;
   $Al_2O_3$ in an amount from 14.5 to 20.5% by weight of the total composition;
   CaO in an amount from 11.0 to 13.2% by weight of the total composition;
   MgO in an amount from 9.4 to 10.9% by weight of the total composition;
   $Na_2O$ in an amount from 0.0 to 4.0% by weight of the total composition; and
   $TiO_2$ in an amount from 0.0 to 2.0% by weight of the total composition,
   wherein said composition has a ΔT of at least 60° C., a log 3 temperature from about 1285° C. to about 1320° C., and is substantially free of $Li_2O$.

2. The composition of claim 1, further comprising $B_2O_3$ in an amount from 0.0 to about 1.0% by weight of the total composition.

3. The composition of claim 2, further comprising:
   $K_2O$ in an amount from 0.0 to about 1.0% by weight of the total composition.

4. The composition of claim 1, wherein said composition has a ΔT up to about 135° C.

5. The composition of claim 4, wherein said composition has a ΔT from about 75° C. to about 105° C.

6. The composition of claim 1, wherein said composition has a log 3 temperature from about 1285° C. to about 1300° C.

7. The composition of claim 1, wherein said composition has a liquidus temperature no greater than about 1330° C.

8. The composition of claim 1, wherein components of said composition are melted in a refractory tank melter.

9. The composition of claim 1, wherein said composition has a specific modulus of at least about 3.24×10⁶ meters.

10. The composition of claim 9, wherein said composition has a specific modulus from about 3.24×10⁶ meters to about 3.43×10⁶ meters.

11. A continuous R-glass fiber produced from a composition comprising:
   $SiO_2$ in an amount from 59.0 to 64.5% by weight of the total composition;
   $Al_2O_3$ in an amount from 14.5 to 20.5% by weight of the total composition;
   CaO in an amount from 11.0 to 12.96% by weight of the total composition;
   MgO in an amount from 9.4 to 10.9% by weight of the total composition;
   $Na_2O$ in an amount from 0.0 to 4.0% by weight of the total composition; and
   $TiO_2$ in an amount from 0.0 to 2.0% by weight of the total composition,
   wherein said composition has a ΔT of at least 60° C. and is substantially free of $Li_2O$, and
   wherein said composition has a density of between 2.606 and 2.638 g/cm3.

12. The glass fiber of claim 11, further comprising at least one of
   $B_2O_3$ in an amount from 0.0 to about 1.0% by weight of the total composition;
   $K_2O$ in an amount from 0.0 to about 1.0% by weight of the total composition.

13. A method of forming an R-glass fiber comprising:
   providing a molten glass composition including:
   $SiO_2$ in an amount from 60.0 to 64.5% by weight of the total composition;
   $Al_2O_3$ in an amount from 14.5 to 20.5% by weight of the total composition;
   CaO in an amount from 11.0 to 13.2% by weight of the total composition;
   MgO in an amount from 9.4 to 10.9% by weight of the total composition;
   $Na_2O$ in an amount from 0.0 to 4.0% by weight of the total composition; and
   $TiO_2$ in an amount from 0.0 to 2.0% by weight of the total composition,
   wherein said composition has a ΔT of at least 60° C., a log 3 temperature from about 1285° C. to about 1320° C., and is substantially free of $Li_2O$; and
   drawing said molten glass composition through orifices in a bushing to form an R-glass fiber.

14. The method of claim 13, further comprising $B_2O_3$ in an amount from 0.0 to about 1.0% by weight of the total composition.

15. The method of claim 13, wherein said composition has a $\Delta T$ up to about 135° C.

16. The method of claim 13, wherein said composition has a specific modulus of at least $3.24 \times 10^6$ meters.

17. The method of claim 13, wherein said composition has a log 3 temperature from about 1285° C. to about 1300° C.

18. The method of claim 13, further comprising:
melting components of said glass composition in a refractory melter.

* * * * *